Dec. 1, 1931.  L. W. SCHAAFF  1,834,874
RING AND BAR TRAVELER CONSTRUCTION
Filed Jan. 7, 1931   2 Sheets-Sheet 2
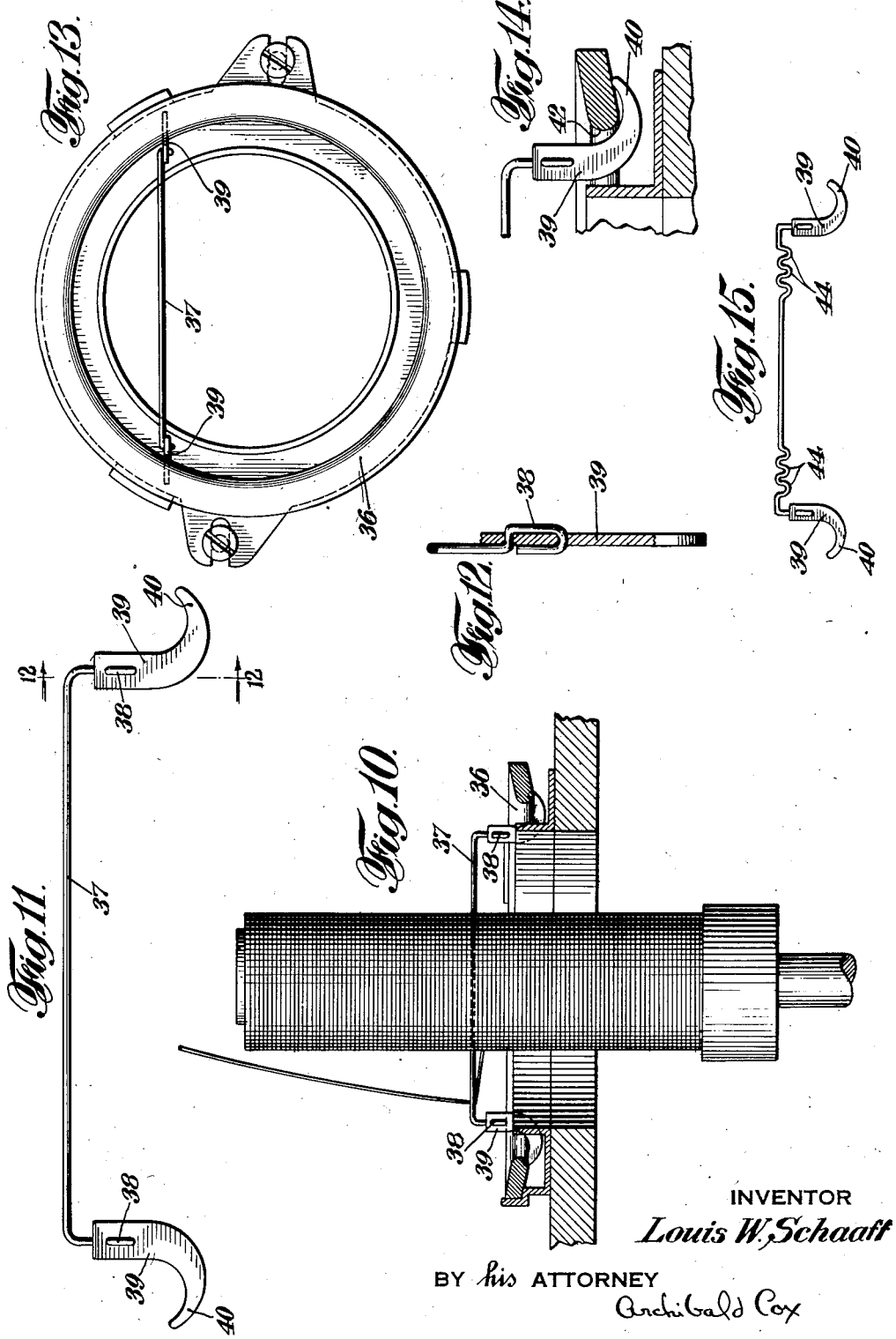
INVENTOR
*Louis W. Schaaff*
BY his ATTORNEY
Archibald Cox Patented Dec. 1, 1931

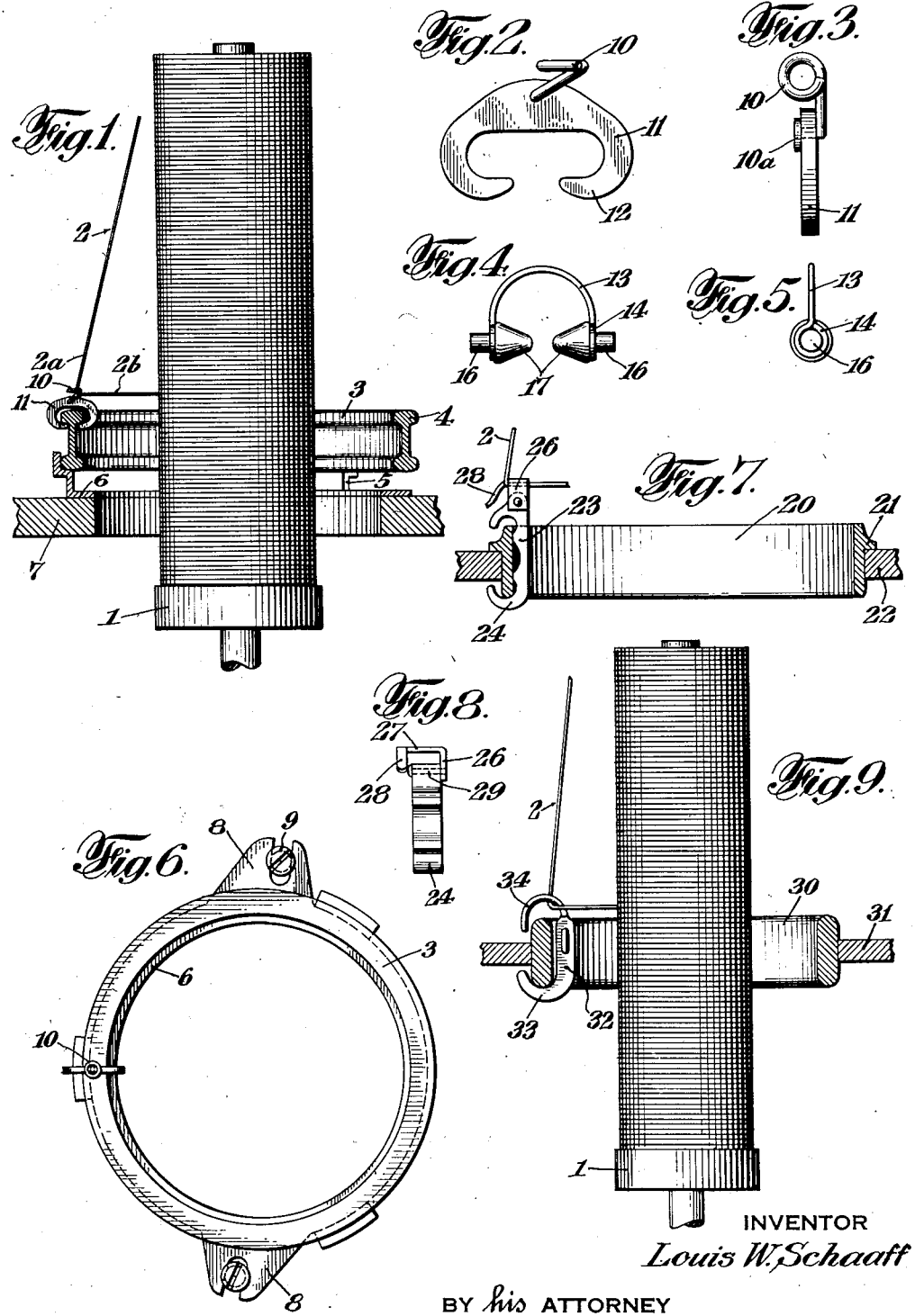

1,834,874

UNITED STATES PATENT OFFICE

LOUIS W. SCHAAFF, OF WEEHAWKEN, NEW JERSEY, ASSIGNOR TO TEXTILE MACHINE-SERVICE CORPORATION OF AMERICA, OF NEW YORK, N. Y., A CORPORATION OF NEW YORK

RING AND BAR TRAVELER CONSTRUCTION

Application filed January 7, 1931. Serial No. 507,226.

This invention relates to improved ring traveler and bar traveler constructions, for cooperation with rings, in the spinning of cotton, flax, silk, rayon and the like. In the past, so far as I am aware, it has been the practice to use travelers which require the application of lubricant to the rings on which the travelers operate. The constructions of these travelers have been such that they can not operate at all, or last for such a short time as to be essentially inoperative, unless some lubricant is used, principally because of the high rates of speed at which they must operate, generally several thousand revolutions per minute.

The use of lubricant in this connection involves a number of serious disadvantages. In the first place, it is periodically necessary to apply the lubricant to the surfaces. This operation is performed by hand and requires considerable time, on the part of a large number of workmen, individually to attend to each of the rings employed in connection with the vast number of spindles at present installed in textile mills. Furthermore, the rings and travelers which have been in operation must be cleaned, before each greasing, to remove the spent lubricant which has become impregnated with dust, dirt and particles of other material which have settled in it from the air. Thus, not only is the machinery idle during these times, but considerable labor is required. Moreover the lubricant must be applied with great care to avoid an excess which would find its way onto the material being spun, causing oily or greasy spots on the latter. The care used depends, of course, on the skill of each particular workman, the results varying accordingly; and even when the required minimum amount of lubricant is applied to the ring surfaces, some of it seems inevitably to spot the material. This oil or grease cannot practicably be removed from the material by any known process, and any attempt to remove it is economically out of the question in any event.

These disadvantages have been recognized for a long while, and, of course, innumerable attempts have been made to devise constructions which would do away with the necessity for the use of lubricants. However, for one reason or another none of these proposals has proved practical, and until the present invention the problem has remained substantially unsolved.

One of the most important considerations involved in the manufacture of ring and bar travelers is their cost, because literally hundreds of thousands of travelers are used annually. That is, it is not enough to produce travelers which will operate satisfactorily for a considerable period of time, but they must be salable at a very low figure. To avoid extensive replacements of rings and other equipment, the travelers must also be capable of operation in connection with the machinery at present in use. In short, the resulting constructions must be simple as well as effective.

At the same time, these travelers must be very sturdy and capable of use over extended periods, because whenever a traveler breaks or wears through, or otherwise becomes defective so that it will no longer operate, it is necessary not only to stop the machine and replace the traveler but since a large number of spindles are operated simultaneously from the same source of power it is necessary to stop a whole bank of them in order to replace a single traveler. Moreover, should one of these travelers sever the yarn or thread which it guides, it becomes necessary to join the ends of the thread in order to continue operations. This also requires that the spindles be stopped until a worker has united the ends of the thread or yarn. This requires some considerable degree of skill and even then results in an imperfect product because the knots in the yarn or thread show in the finished product. Thus it is extremely important that the travelers operate without breakage over extended periods.

Another disadvantage of prior constructions lies in the tremendous racket which the operation of the travelers at present in use causes. Every one familiar with spinning mills is acquainted with this noise, which has a bad effect on the mill hands and tends generally to reduce the morale of the force.

It is therefore highly desirable to reduce or eliminate this constant nerve-racking drone which at present pervades all spinning mills.

The principal object of the present invention hence resides in the provision of constructions which avoid the above disadvantages and at the same time are simple and inexpensive to manufacture and efficient in operation.

With this object in view, I have devised improved travelers, some embodiments of which will be described with reference to the accompanying drawings wherein:—Fig. 1 is an elevation, partly in section, of certain portions of a spinning device showing the preferred form of ring traveler in accordance with the present invention. Fig. 2 is an enlarged side elevation of the traveler shown in Fig. 1. Fig. 3 is an end elevation of a modification of the traveler shown in Fig. 2. Fig. 4 is a side elevation of another form of traveler, and Fig. 5 is an end elevation of the same. Fig. 6 is a plan view of the ring construction shown in Fig. 1, for cooperation with the travelers shown in Figs. 1 to 5. Fig. 7 is a section through a ring for the form of ring traveler shown therewith. Fig. 8 is an end elevation of the traveler shown in Fig. 7, looking from the left. Fig. 9 is a view similar to Fig. 1, but showing still another form of ring traveler. Fig. 10 is a view similar to Fig. 1, but illustrating a bar traveler and ring adapted therefor. Fig. 11 is an enlarged side view of the traveler shown in Fig. 10. Fig. 12 is a vertical section on the line 12—12 of Fig. 11. Fig. 13 is a plan view of the ring construction shown in Fig. 10. Fig. 14 is a detailed view of a portion of the traveler and ring shown in Fig. 10. Fig. 15 is a side view of a modified form of bar traveler.

There is shown at 1 a bobbin for receiving thread 2. A ring 3, provided with lateral flanges 4, for purposes hereafter described, is carried by means of feet 5 upon a supporting ring 6, the latter being secured to a reciprocating bed plate 7 by means of extensions 8 thereon and screws 9. In Figs. 1, 2 and 3 there is shown a preferred form of ring traveler in accordance with the present invention. This traveler consists generally of a metallic thread-guiding portion and a hook-shaped portion for engagement with a laterally extending portion of the ring, said hook-shaped portion being composed of non-metallic material where it contacts with the ring when the traveler is in operation by reason of the pull of the thread on the thread-guiding portion. For example a wire 10 in the form of a pigtail may be secured by a portion 10a to a non-metallic element 11 having laterally extending portions 12. Element 11 is preferably composed of some material such as fiber or other densely compacted material which has sufficient hardness and wearing properties for present purposes. Of the known synthetic or fabricated materials of this character fiber is preferred for the reasons, among others, that it is ordinarily prepared in sheets of desired thickness, from which the elements in any shape may be stamped, and it has been found that for present purposes an edge contact of the fiber as shown at Fig. 1 is especially advantageous, the fiber being as thin as is practicable in keeping with the other desirable properties of the travelers, such as strength and durability. It is to be understood that it is not necessary that the whole element 11 be composed of fiber or the like, although this is expedient; it is only necessary that the portions 12 be of non-metallic material where they touch the ring. And when the term "hook-shaped" is used herein it intends a portion adapted to extend beneath the lower surface of the ring and engage it over a small area (as would a hook) upon upward pull on the traveler. In Figs. 1 and 2 it will be noted that the loop in the pigtail lies in a generally horizontal plane and so that the portion against which the thread rides is nearer the bobbin than the center of the traveler. Moreover, the pigtail is adapted to cooperate with the thread so that the portions 2a and 2b on each side of the point of contact with the pigtail are the same plane, or in other words so that the thread in passing around the traveler makes but a single bend instead of a double twist as in constructions like that shown in Fig. 9. Thus the thread is relieved of certain undesirable strains heretofore imposed on it. In Fig. 3 the loop in the pigtail is in a vertical plane instead of in a generally horizontal plane.

As further illustrating what I mean by hook-shaped, there is shown in Figs. 4 and 5 a modified ring traveler construction in accordance with this invention. A wire 13 or equivalent device of metallic material is formed as a U with the ends 14 bent in suitable shape to grip the extensions 16 on non-metallic elements 17 which form the hooks for engaging the lower surfaces of the flanges of a ring such as that shown in Fig. 1.

In Fig. 7 there is shown another modification of the present invention especially adapted for carrying a traveler suitable for the spinning of heavy strands. In this construction a ring 20 is provided with a flange 21 for resting against the bed plate 22 in which the ring fits. The traveler is composed of non-metallic material, in the main, and has a body portion 23 and a hook-shaped or laterally extending portion 24 adapted to contact with the lower edge of the ring 20. This traveler is provided with a metallic thread guiding portion secured to the body portion by a bolt 29 and consisting of a vertical arm 26, a horizontal arm 27 extending generally in a direction perpendicular to a radius of the ring and an arm 28 substantially perpendicular to arm 27. This construction permits the thread to assume the position shown in Fig. 7 and provides for securing the same advantages as does the pigtail. That is, the thread in operation of the device lies underneath the horizontal arm 27 and in the corner between arms 27 and 28. The thread thus pulls a non-metallic portion of the traveler against the under edge of the ring 20. In Fig. 9 there is shown another modification of ring and traveler, the ring 30 being rounded at its lower edge for cooperation with the traveler. The ring has frictional engagement with the bed plate 31. The traveler as shown is composed of a non-metallic element 32 having a hook-shaped portion 33 adapted to contact with the ring. Secured to this non-metallic element, of fiber or the like, is a wire 34 adapted to cooperate with the thread or yarn being spun. Again, it is to be noted that the portion 33 is essentially of non-metallic material while the balance of element 32 may be of either metal or non-metal as seems advisable from manufacturing standpoints.

In Fig. 10 there is shown a construction that is as far as the bobbin and ring support are concerned, similar to these parts as shown in Fig. 1, but including a ring 36 for cooperation with bar travelers, especially for use in spinning silk and rayon. The bar traveler illustrated consists of a metallic element 37 having portions preferably in the form of a loop 38 for securing it in suitable manner to non-metallic elements 39 which have portions 40 extending laterally for engagement with the ring. These portions may also be designated hook-shaped; their function is similar to that of the corresponding portions of the ring travelers already described. Here again, it is essential that the portions of the traveler which contact with the ring be non-metallic, as for example in Fig. 14, where the tip of the hook touches the ring at its under side and the edge of the element 39 contacts with the ring at its inner side. It will be appreciated that in constructions of this character the curve given to the hook-shaped portion should be considerably less sharp than the curved inner face of the ring, for instance as shown at 42, whereby area of contact is reduced.

With my improved constructions, it frequently happens that before the traveler wears out or breaks due to the friction between it and the ring, the thread will wear through the metallic portion of the traveler. Hence, I have shown in Fig. 15 a traveler in which humps 44 are provided, between which thread may be placed, and moved from one point of contact to another as the traveler shows signs of wear.

It will be seen that in the novel constructions illustrated the ring engaging portions are so devised that there is room for play between them and their respective rings, and that the thread-guiding portions are so positioned that the pull of the thread draws the hook-shaped portions into contact with the rings in operation of the spinning devices, whereby the metallic thread-guiding portions are spaced from the rings.

While several examples have been described in detail, it will be apparent that constructions involving the principles of my invention may take many forms, and hence these examples are not to be construed as necessarily limiting the invention to any of the details shown. For instance, instead of securing the ends of the wire or other metallic element to the non-metallic element as shown, they may be embedded therein. These and other variations will naturally occur to those working in this field.

This application is in part a continuation of my co-pending application Serial No. 432,013.

I claim:—

1. As a new article of manufacture, for use with a metallic spinner ring, a traveler having a hook-shaped portion of densely compacted non-metallic wear resisting material for engagement with a portion of the spinner ring, and a metallic thread-guiding portion secured to the hook-shaped portion and so positioned that when in use the pull of the thread passing through the thread-guiding portion will draw the said non-metallic hook into contact with a portion of the spinner ring, said traveler being usable without lubrication.

2. A traveler comprising a relatively thin-edge, hook-shaped portion composed of densely compacted non-metallic wear-resisting material, and a metallic thread-guiding portion secured thereto and so positioned that when in use the pull of the thread upon the thread-guiding metallic portion will draw an edge of the non-metallic hook into contact with a portion of the spinner ring with which the traveler is employed, said traveler being operable without lubrication.

3. A traveler of the class described, comprising a relatively thin-edge member having a hook-shaped portion at one end composed of densely compacted non-metallic wear-resisting material, and a metallic thread-guiding portion consisting of a length of wire having one end secured to the said non-metallic member at a point removed from the hook-shaped portion and its other end bent to provide a thread guide so positioned relative to the hook that when in use the pull of the thread upon the guide will draw an edge of the hook into contact with a portion of the spinner ring with which the traveler is employed, said traveler being operable without lubrication.

4. As a new article of manufacture, for use with a metallic spinner ring, and without requiring lubrication, a traveler composed of densely compacted fiber having wear-resisting properties for contact with the ring and a metallic thread-guiding portion secured to said fiber.

5. As a new article of manufacture, for use with a metallic spinner ring, and without lubrication, a traveler having a flat portion composed of densely compacted synthetic, non-metallic material having wear-resisting properties for contact with the ring and a metallic thread-guiding portion secured to said synthetic, non-metallic material.

6. A ring traveler including a flat integral element of densely compacted non-metallic wear-resisting material having laterally extending portions for edge contact with the ring, and a metallic thread guiding portion secured to said element and positioned so that the pull of the thread will urge an edge of at least one of said laterally extending portions against the ring, the portions of the traveler above the ring then being out of contact therewith.

7. A ring traveler including a flat integral element of densely compacted non-metallic wear-resisting material having laterally extending portions for edge contact with the ring, and a wire thread guiding portion secured to said element and positioned so that the pull of the thread will urge an edge of at least one of said laterally extending portions against the ring, the portions of the traveler above the ring then being out of contact therewith.

8. A bar traveler for use without lubrication, comprising a wire having non-metallic hook-shaped portions secured to either end thereof for edge contact with a spinner ring, said portions composed of densely compacted non-metallic wear-resisting material.

9. A bar traveler for use without lubrication composed of a wire having hook-shaped portions of densely compacted fibrous material secured to either end thereof for edge contact with portions of a spinner ring, each end of said wire having a loop with portions thereof lying on opposite faces of the hook-shaped portion.

10. A traveler for use without lubrication having a hook-shaped non-metallic member composed of densely compacted wear-resisting material for direct engagement with a spinner ring, and a metallic thread guiding portion carried by said member.

11. A traveler for use without lubrication comprising a relatively thin non-metallic member of densely compacted wear-resisting material having opposed hook-shaped portions, and a metallic thread guiding portion looped about and secured to said member.

12. A traveler for use without lubrication comprising a relatively thin non-metallic member of densely compacted wear-resisting material having opposed hook-shaped portions arranged in the same plane, and a metallic thread guiding portion secured to said member substantially centrally thereof.

13. A traveler for use without lubrication comprising a relatively thin non-metallic member of densely compacted material having opposed inwardly directed hook-shaped portions for edge-contact with a spinning ring, and a metallic open loop thread guiding portion secured to said member, between the hook-shaped portions.

14. A traveler such as defined in claim 8, wherein the wire is provided with undulations forming spaced humps for the purpose described.

LOUIS W. SCHAAFF.